United States Patent
Minami et al.

(10) Patent No.: US 7,126,294 B2
(45) Date of Patent: Oct. 24, 2006

(54) METHOD AND DEVICE FOR CONTROLLING PHOTOVOLTAIC INVERTER, AND FEED WATER DEVICE

(75) Inventors: Masahiro Minami, Kawasaki (JP); Hiroaki Ichikawa, Kawasaki (JP); Masahito Kawai, Tokyo (JP); Yukio Murai, Tokyo (JP); Kaoru Nakajima, Tokyo (JP)

(73) Assignees: Ebara Corporation, Tokyo (JP); Fuji Electric Holdings Co., Ltd., Kanagawa (JP)

( * ) Notice: Subject to any disclaimer, the term of this patent is extended or adjusted under 35 U.S.C. 154(b) by 0 days.

(21) Appl. No.: 10/503,384

(22) PCT Filed: Jan. 29, 2003

(86) PCT No.: PCT/JP03/00830

§ 371 (c)(1),
(2), (4) Date: Jan. 6, 2005

(87) PCT Pub. No.: WO03/065564

PCT Pub. Date: Aug. 7, 2003

(65) Prior Publication Data
US 2005/0116671 A1  Jun. 2, 2005

(30) Foreign Application Priority Data
Jan. 31, 2002 (JP) ............................. 2002-023668

(51) Int. Cl.
G05F 1/67 (2006.01)
G05F 5/00 (2006.01)

(52) U.S. Cl. .................. 318/139; 323/906; 323/299; 363/55; 363/60; 363/95; 363/98

(58) Field of Classification Search .................. None
See application file for complete search history.

(56) References Cited

U.S. PATENT DOCUMENTS

| | | | |
|---|---|---|---|
| 4,375,662 A * | 3/1983 | Baker | 363/95 |
| 4,390,940 A * | 6/1983 | Corbefin et al. | 363/132 |
| 4,404,472 A * | 9/1983 | Steigerwald | 307/46 |
| 4,494,180 A * | 1/1985 | Streater et al. | 363/37 |
| 4,620,140 A * | 10/1986 | Chonan | 388/816 |
| 4,649,334 A * | 3/1987 | Nakajima | 323/299 |
| 4,678,983 A * | 7/1987 | Rouzies | 323/222 |
| 4,868,379 A * | 9/1989 | West | 250/203.4 |
| 4,916,382 A * | 4/1990 | Kent | 323/299 |
| 4,999,560 A * | 3/1991 | Morishima et al. | 318/779 |
| 5,235,266 A * | 8/1993 | Schaffrin | 323/205 |
| 5,293,447 A * | 3/1994 | Fanney et al. | 392/449 |
| 5,493,204 A * | 2/1996 | Caldwell | 323/299 |
| 5,560,218 A * | 10/1996 | Jang | 62/228.4 |

(Continued)

FOREIGN PATENT DOCUMENTS

JP  6-214667  8/1994

Primary Examiner—Lincoln Donovan
Assistant Examiner—Robert W. Horn
(74) Attorney, Agent, or Firm—Young & Thompson

(57) ABSTRACT

A photovoltaic inverter control method includes steps of monitoring a variation in output voltage of a solar battery by a power and voltage monitoring circuit (51) and, when the variation occurs, accelerating or decelerating an electric motor (3) to maximize the output voltage of the solar battery (1), whereby the electric motor for driving, for example, a pump and a fan by the solar battery as a power source can be driven by a photovoltaic inverter always at the maximum power point of the solar battery.

11 Claims, 6 Drawing Sheets

U.S. PATENT DOCUMENTS

| | | | |
|---|---|---|---|
| 5,569,998 A * | 10/1996 | Cowan | 307/66 |
| 5,621,248 A * | 4/1997 | De Villiers | 290/30 R |
| 5,654,883 A * | 8/1997 | Takehara et al. | 363/79 |
| 5,682,305 A * | 10/1997 | Kurokami et al. | 363/79 |
| 5,747,967 A * | 5/1998 | Muljadi et al. | 320/148 |
| 5,838,148 A * | 11/1998 | Kurokami et al. | 323/299 |
| 5,869,956 A * | 2/1999 | Nagao et al. | 323/299 |
| 5,892,354 A * | 4/1999 | Nagao et al. | 323/299 |
| 5,923,158 A * | 7/1999 | Kurokami et al. | 323/299 |
| 6,046,919 A * | 4/2000 | Madenokouji et al. | 363/98 |
| 6,082,122 A * | 7/2000 | Madenokouji et al. | 62/77 |
| 6,175,217 B1 * | 1/2001 | Da Ponte et al. | 322/19 |
| 6,327,994 B1 * | 12/2001 | Labrador | 114/382 |
| 6,434,960 B1 * | 8/2002 | Rousseau | 62/228.4 |
| 6,453,693 B1 * | 9/2002 | Ewert et al. | 62/236 |
| 6,469,487 B1 * | 10/2002 | Ewert et al. | 62/228.4 |
| 6,590,793 B1 * | 7/2003 | Nagao et al. | 363/95 |
| 6,678,174 B1 * | 1/2004 | Suzui et al. | 363/55 |
| 6,855,016 B1 * | 2/2005 | Jansen | 440/6 |
| 6,879,502 B1 * | 4/2005 | Yoshida et al. | 363/60 |
| 6,892,165 B1 * | 5/2005 | Yagi et al. | 702/183 |
| 6,917,181 B1 * | 7/2005 | Emori et al. | 320/104 |
| 6,922,348 B1 * | 7/2005 | Nakajima et al. | 363/95 |
| 6,930,868 B1 * | 8/2005 | Kondo et al. | 361/42 |
| 2005/0116671 A1 * | 6/2005 | Minami et al. | 318/275 |

\* cited by examiner

METHOD AND DEVICE FOR CONTROLLING PHOTOVOLTAIC INVERTER, AND FEED WATER DEVICE

TECHNICAL FIELD

The present invention relates to a method of controlling a photovoltaic inverter for converting and controlling DC power supplied by solar cells into AC power (hereinafter referred to as "photovoltaic inverter") and for variable-speed controlling an AC motor by making the operating point of the solar cells to follow the maximum power point to drive the motor, and to a water feeding device for feeding water by, for example, driving a pump and a fan with a motor variable speed-controlled by means of the method and device for controlling a photovoltaic inverter for variable-speed controlling a motor for driving a pump, a fan and the like.

BACKGROUND ART

The solar cell has a voltage (V)–power (P) characteristics wherein power tends to increase as the amount of insolation increases as shown in FIG. 7 when the incident amount of insolation is taken as a parameter, provided that in FIG. 7 Pa, Pb, and Pc represent the maximum power points in the respective amount of insolation.

As a controlling method for extracting efficiently the maximum power through a photovoltaic inverter from the solar cell having such a characteristic, the so-called maximum power point tracking control method (MPPT control method) is used, wherein the photovoltaic inverter is controlled by generating minute changes in the load of this solar cell and some other means to monitor the ratio of the respective variation dP and dV ($\Delta$, $\Delta$=dP/dV) of the output power (P) and voltage (V) of the solar cell, and calculating the point where its polarity changes from positive to negative (or from negative to positive) (the maximum power point) so that the operating point of the solar cell may follow this point.

FIG. 8 is a circuit diagram showing an example of a conventional control device of a photovoltaic inverter based on the MPPT control method for controlling the output of solar cells. In this figure, 1 represents a solar cell, 2 represents a photovoltaic inverter for controlling the output of this solar cell, 3 represents an AC motor driven by the photovoltaic inverter 2, and 4 represents a mechanical load consisting of, for example, a pump, a fan or the like mechanically connected with the driving shaft of the motor 3 and rotatively driven by the same. The description below relates to the case of using a pump for the mechanical load 4.

This photovoltaic inverter 2 includes a voltage detector 21 for detecting the output voltage (V) of the solar cell 1, a diode 22 for blocking the countercurrent flowing from the inverter main circuit 25 described below, a current detector 23 for detecting the current (I) supplied from the solar cells 1, a capacitor 24 for smoothing DC voltage, an inverter main circuit 25 constituted, for example, by making a three-phase bridge connection of switching circuits constituted by connecting back to back a transistor and a diode, and a controlling device 26 for controlling to desired values of the voltage and frequency of the AC output of the inverter main circuit 25 based on the output voltage V and the output current I from the solar cell 1 detected by the voltage detector 21 and the current detector 23.

The control device 26 includes a maximum power point tracking (MPPT) monitoring circuit 31, a rotational speed instructing device 32, an adjustable speed controller 33, a function generator 34, and an inverter controlling circuit 35. The operation of this control device 26 will be described below with reference to FIG. 9.

In the first place, a start-up frequency instruction value $f_s$ is outputted from the adjustable speed controller 33 based on a start-up instruction to the solar cell 1 having a voltage–power (V–P) characteristic similar to the one shown in FIG. 9 depending on a given amount of insolation. Then, the inverter control circuit 35 performs pulse width modulation (PWM) operations based on voltage instruction values Vs corresponding to this start-up frequency instruction value $f_s$ and those corresponding to the frequency instruction value $f_s$ given by a function generator 34 that converts frequency instructions into voltage instructions by, for example, a function that converts the voltage/frequency ratio into a constant value. The control signals based on the result of such operations allow the ON/OFF control of the respective transistor constituting the inverter main circuit 25. Then, the inverter main circuit 25 generates AC power of a frequency and a voltage corresponding to the start-up frequency instruction value and the voltage instruction value and accordingly the motor 3 and the pump 4 start.

At this time, based on the values detected (V, I) respectively by the voltage detector 21 and the current detector 23 at previously fixed intervals, the MPPT monitoring circuit 31 calculates the variation (dP) of power (P, P=V×I) and the variation (dV) of voltage (V) and monitors the ratio$\Delta$ of the power variation to the voltage variation ($\Delta$=dP/dV). However, when the motor 3 and the pump 4 starts as described above, the voltage of the solar cells 1 drops from a voltage $V_1$ in the unloaded condition to a voltage in the loaded condition, and the $\Delta$ becomes negative ($\Delta$<0). This is outputted in the rotational speed instructing device 32.

And the rotational speed instructing device 32 outputs a speed instruction value $\Delta$n (constant value) representing a speed increase or a speed reduction corresponding to the polarity of $\Delta$ mentioned above. In other words, when the $\Delta$ is negative (see FIG. 9), a speed increase instruction value in the form of a positive +$\Delta$n is outputted, and when the $\Delta$ is positive (see FIG. 9), a speed reduction instruction value in the form of a negative –$\Delta$n is outputted. Therefore, when the $\Delta$ is almost nil, the outputted $\Delta$n will also be almost nil.

And the adjustable speed controller 33 integrates $\Delta$n inputted by the rotational speed instructing device 32, and the calculation result is added to the start-up frequency instruction value $f_s$ to be outputted as a frequency instruction value. When the integrating time is adjusted by the polarity of $\Delta$n, the motor current is previously set at a given value so that the instructed speed may be attained as soon as possible without causing the motor current to turn into an overcurrent.

In other words, the voltage amplitude and frequency of the AC power outputted from the inverter main circuit 25 rises up to the voltage $V_2$ which will be the maximum power point of the solar cells 1 shown in FIG. 9 in response to the output of the MPPT monitoring circuit 31 constituting a controlling device 26 after the motor 3 and the pump 4 started running by the AC power of the startup voltage and frequency from the inverter main circuit 25, and in response thereto the rotational speed of the motor 3 and the pump 4 increases.

When, for some reason, the voltage of the solar cells 1 dropped below the $V_2$ mentioned above, in other words, when it is in a state of having passed the maximum power point, both the power P and the voltage V drop and therefore the ratio $\Delta$ of variation of the power and voltage outputted from the MPPT monitoring circuit 31 becomes positive ($\Delta>0$) and a speed reduction instruction is given to the inverter. As a result, the motor 3 reduces its speed and consequently its power consumption, and the operating point shifts to the side of the maximum power point of the solar cell. Such a control of the photovoltaic inverter enables to make the loaded condition of the motor follow the maximum power point of the solar cell.

According to the conventional controlling method of photovoltaic inverter described above, due to the fact that the integrating time of + and − polarity in the adjustable speed controller 33 is set at a constant value with reference to a $\Delta n$ of a constant value outputted by the rotational speed instructing device 32 in order to perform the MPPT control, the acceleration time (time required to accelerate unit revolutions) and the deceleration time (time required to decelerate unit revolutions) of the motor 3 in the vicinity of the maximum power point are relatively short, they tend to roam around the maximum power point and caused the control operation to fluctuate. And when the respective integrating time of the + and − polarities is set at a longer value in order to reduce this fluctuation, a new problem arises in that the settling time for the MPPT control and the response time accompanying a rapid change in the amount of insolation grow longer.

The object of the present invention is to provide a new method of controlling photovoltaic inverters that solves the above-mentioned problems.

DISCLOSURE OF INVENTION

In order to achieve the object mentioned above, the invention relates to a method of controlling a photovoltaic inverter by variable speed controlling a motor powered by a solar cell, wherein the starting power supplied from the solar cell through the photovoltaic inverter is used to start the motor while the power and voltage outputted by the solar cell is respectively monitored, and during the process of accelerating the rotational speed of the motor for a given acceleration time, the voltage value of the solar cell when the power of the solar cell has reached the maximum power point is stored as a reference voltage $V_{BASE}$, and the acceleration is maintained until the voltage of the solar cell reaches a level ($V_{BASE}-V_{OVER}$) lower than the reference voltage $V_{BASE}$ by a previously set voltage range $V_{OVER}$, and after the voltage of the solar cell has reached this voltage ($V_{BASE}-V_{OVER}$), the speed of the motor is decelerated for a given deceleration time, and after this deceleration operation is over, when the voltage of the solar cell is within a given allowable voltage regulation range Hb with reference to the reference voltage $V_{BASE}$, the photovoltaic inverter is controlled in such a way that the motor may continue operating at the current rotational speed.

Further, when the voltage of the solar cells has risen beyond the given allowable voltage regulation range Hb with reference to the reference voltage $V_{BASE}$ during the continued operation, the rotational speed of the motor is accelerated during the given acceleration time until the voltage of the solar cells reaches the voltage ($V_{BASE}-V_{OVER}$) lower than the reference voltage $V_{BASE}$ by a previously set voltage range $V_{OVER}$, and in the process of this acceleration, the value of voltage of the solar cells at the time when the power of the solar cell has reached the maximum power point is stored as the new reference voltage $V_{BASE}2$ and after the voltage of the solar cells has reached the voltage $V_{BASE}-V_{OVER}$, the photovoltaic inverter is controlled in such a way that the rotational speed of the motor is decelerated for a given deceleration time until the voltage of the solar cells shifts from this voltage to the new reference voltage $V_{BASE}2$.

In addition, when the voltage of the solar cells has fallen beyond the given allowable voltage regulation range Hb with reference to the reference voltage $V_{BASE}$ during the continued operation, the rotational speed of the motor is decelerated for the given deceleration time until the voltage of the solar cells reaches the reference voltage $V_{BASE}$, the rotational speed of the motor is accelerated for the given acceleration time until the voltage of the solar cells reaches a level ($V_{BASE}-V_{OVER}$) lower than the reference voltage $V_{BASE}$ by a previously set voltage range $V_{OVER}$, and in the process of this acceleration, the voltage value of the solar cell at the time when the power of the solar cell has reached the maximum power point is stored as the new reference voltage $V_{BASE}3$, and after the voltage of the solar cells has reached the voltage $V_{BASE}-V_{OVER}$, the photovoltaic inverter is controlled in such a way that the rotational speed of the motor is decelerated by a given deceleration time until the voltage of the solar cells shifts from this voltage to the new reference voltage $V_{BASE}3$.

Further still, when the voltage of the solar cells has dropped beyond the minimum voltage value $V_{LOW}$ tolerated for the solar cells during the continuous operation described above, in the first place the rotational speed of the motor is rapidly decelerated by a faster deceleration time than the given deceleration time mentioned above until the voltage of the solar cells reaches the minimum voltage $V_{LOW}$, and then rotational speed of the motor is decelerated by the given deceleration time until the voltage of the solar cells reaches the reference voltage $V_{BASE}$, and after the voltage of the solar cells has reached the reference voltage $V_{BASE}$, the rotational speed of the motor is accelerated for the given acceleration time until the voltage of the solar cells reaches the voltage ($V_{BASE}-V_{OVER}$) lower than the reference voltage $V_{BASE}$ by a previously set voltage range $V_{OVER}$, and during this acceleration process the voltage value of the solar cells prevailing at the time when the power of the solar cell has reached the maximum power point is stored as the new reference voltage $V_{BASE}4$, and after the voltage of the solar cells has reached the level ($V_{BASE}-V_{OVER}$), the photovoltaic inverter is controlled in such a way that the speed of the motor may decelerate for the given deceleration time until the voltage of the solar cells shifts from this voltage to the new reference voltage $V_{BASE}$4.

The motor may be one that drives either a pump or a fan.

In addition, the acceleration time and the deceleration time of the motor for driving the pump or the fan are set at values equivalent to the cube $(n/N_{MAX})^3$ of the ratio of the current rotational speed instructing value (n) to the maximum value set ($N_{MAX}$).

The invention also relates to a controlling device of photovoltaic inverters for variable-speed controlling a motor driven by a solar cell as its power source including a power and voltage monitoring means for monitoring respectively the power and voltage of the solar cells, an instructing value operation means for outputting acceleration or deceleration instructions based on the outputs of this power and voltage monitoring means, a gradient coefficient operation means for outputting acceleration time and deceleration time, and an adjustable speed controller for outputting frequency instructions based on the outputs of the instructing value operation means and the gradient coefficient operation means, wherein, in the process of accelerating the motor, the voltage value of the solar cell at the time when the power of the solar cell has reached the maximum power point is stored as the reference voltage $V_{BASE}$, and at the same time the motor is accelerated until the voltage of the solar cells shifts from the reference voltage $V_{BASE}$ to a level ($V_{BASE}-V_{OVER}$) lower than the reference voltage $V_{BASE}$ by a previously set voltage range $V_{OVER}$, and after the voltage of the solar cells has reached the voltage ($V_{BASE}-V_{OVER}$), the speed of the motor is decelerated until the voltage of the solar cells shifts from this voltage to the reference voltage $V_{BASE}$, and when, after this deceleration operation, the voltage of the solar cells is in the given allowable voltage regulation range Hb with reference to the reference voltage $V_{BASE}$, the photovoltaic inverter is controlled in such a way that the motor may continue running at the current rotational speed.

The invention still further relates to a water feeding device for feeding water by driving a pump with a motor variable-speed controlled by a photovoltaic inverter operating on a solar cell as its power source wherein, the power and voltage of the solar cells are respectively monitored, the motor is started and is accelerated for a given acceleration time during which process the voltage value of the solar cell at the time when the power of the solar cell has reached the maximum power point is stored as the reference voltage $V_{BASE}$, and at the same time the motor is accelerated until the voltage Vo of the solar cell passes from the reference voltage $V_{BASE}$ to a level ($V_{BASE}-V_{OVER}$) lower than the reference voltage $V_{BASE}$ by a previously set voltage range $V_{OVER}$. When the voltage of the solar cells has reached the voltage ($V_{BASE}-V_{OVER}$), the motor is decelerated until the voltage of the solar cells shifts from this voltage to the reference voltage $V_{BASE}$. When, following this deceleration operation, the voltage of the solar cells is in the given allowable voltage regulation range Hb in reference to the reference voltage $V_{BASE}$, the motor is kept operating at the current rotational speed to drive the pump and to feed water.

According to the present invention, in allowing the photovoltaic inverter to variable-speed control the motor fed with power from solar cells, the monitoring of changes in the terminal voltage of the solar cells enables to grasp changes in the amount of insolation to the solar cell, to shift promptly to the new maximum power points of the solar cells and improve the stability of the controlling operation in the vicinity of the maximum power point.

In addition, for example, in variable-speed controlling a motor for driving pumps and fans, it is possible to improve the responsiveness to controlling operations by noting that the power required by the motor is proportional to the cube of the rotational speed and by correcting the acceleration and deceleration times of the motor based on that value.

THE BEST MODE FOR CARRYING OUT THE INVENTION

The embodiment of the present invention shown in the figures will be described below.

Figure 1:
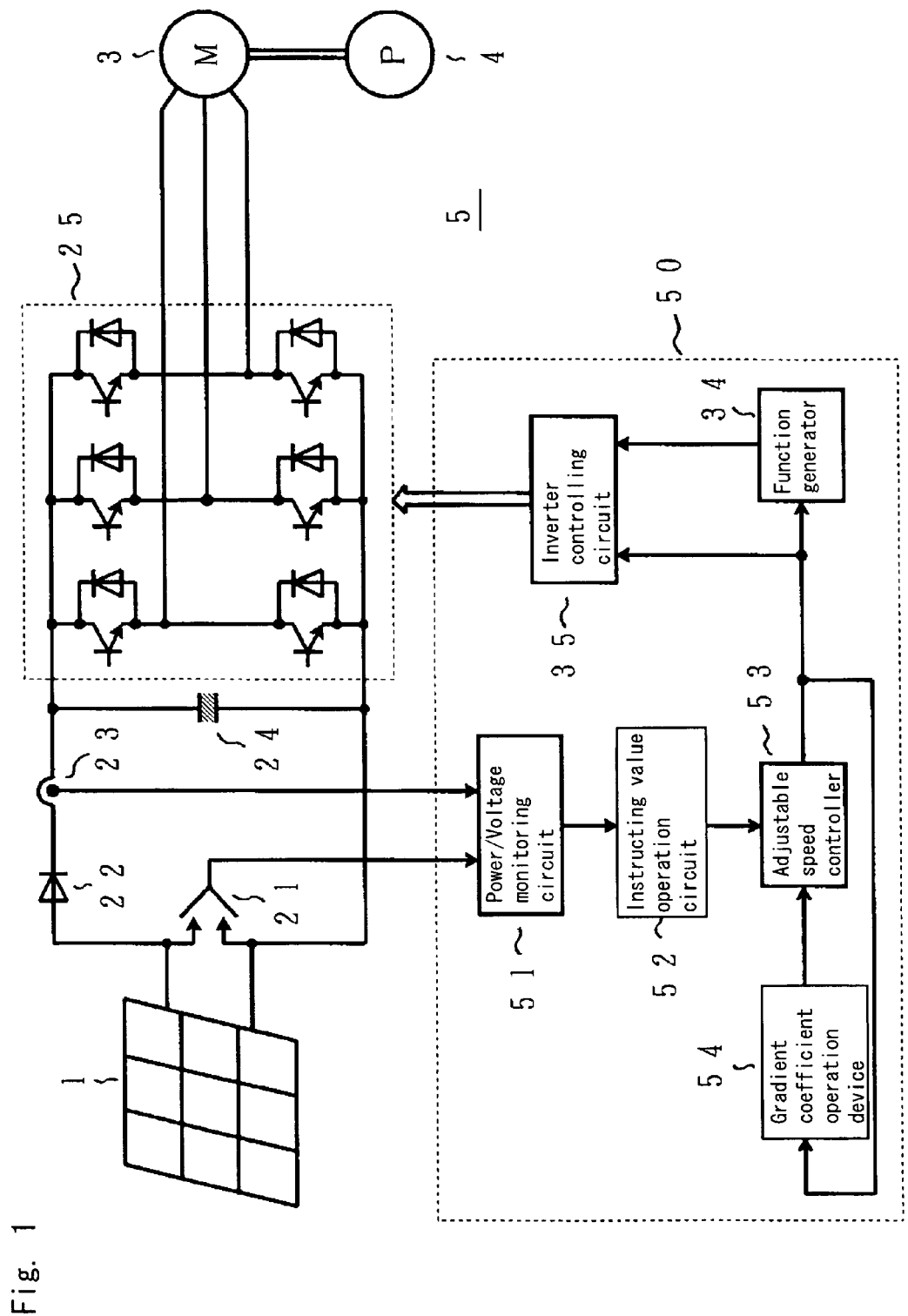
FIG. 1 is a circuit diagram of a photovoltaic inverter showing a mode of carrying out the present invention.
Figure 8:
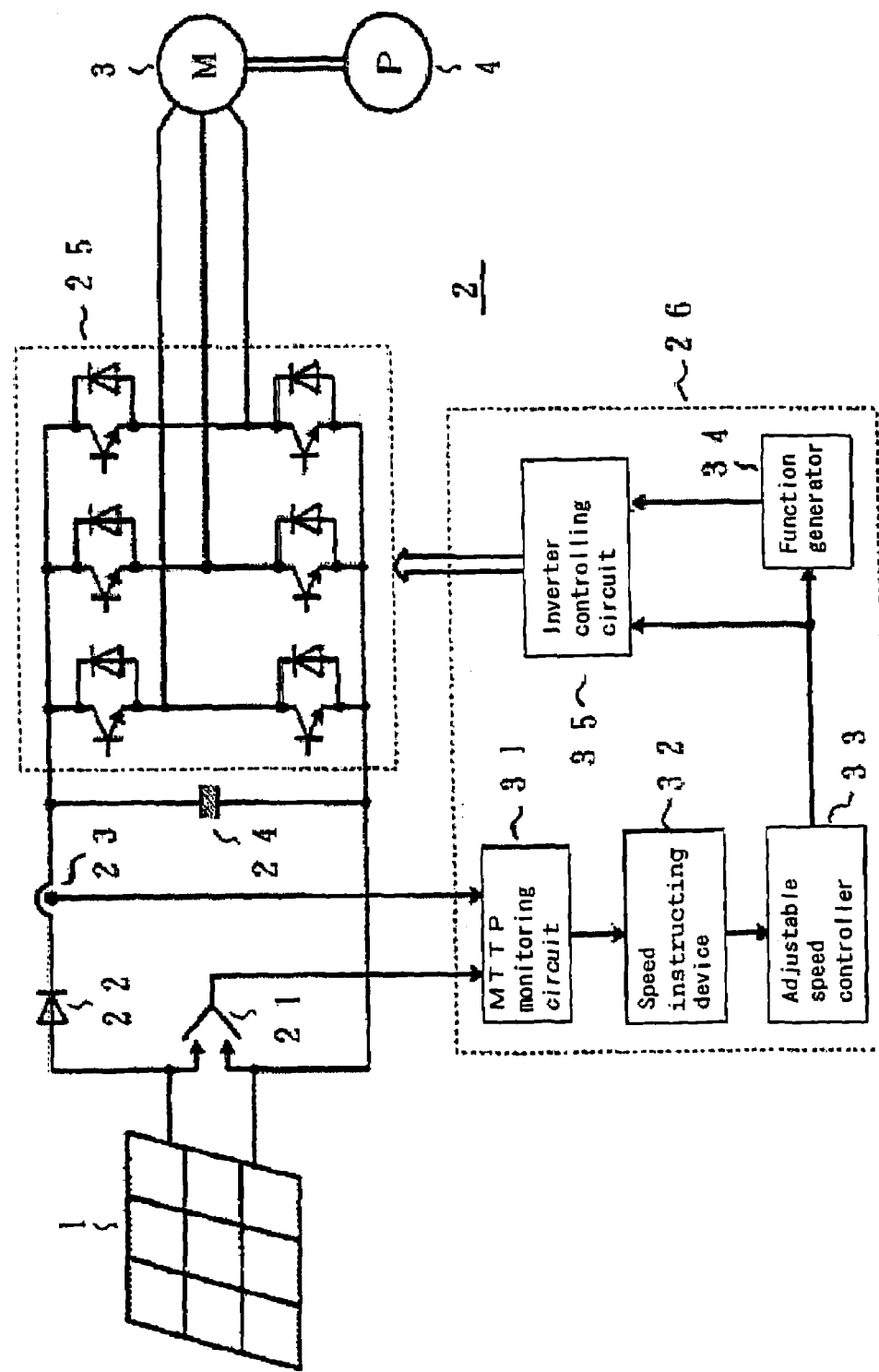
FIG. 8 is a circuit diagram showing a conventional example of the photovoltaic inverter.
Figure 9:
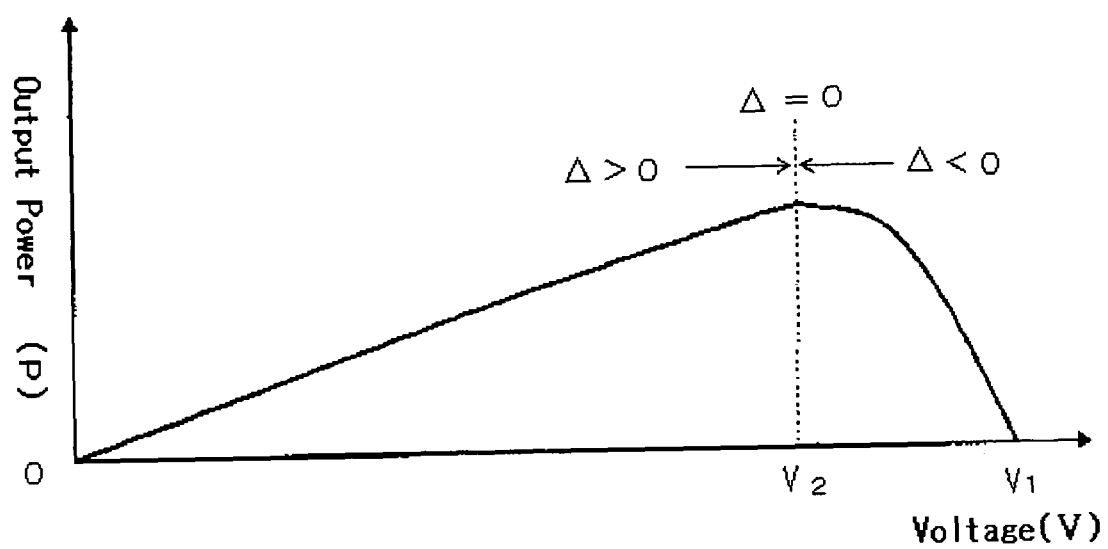
FIG. 9 is a characteristic graph describing the operation of FIG. 8.

FIG. 1 is a circuit diagram of a photovoltaic inverter showing an embodiment of the present invention, and the components having the same function as the conventional circuits shown in FIG. 8 are indicated by the same codes.

In other words, the photovoltaic inverter 5 shown in FIG. 1 includes a controlling device 50 in place of the controlling device 26 of the conventional photovoltaic inverter 2 shown in FIG. 8.

Figure 2:
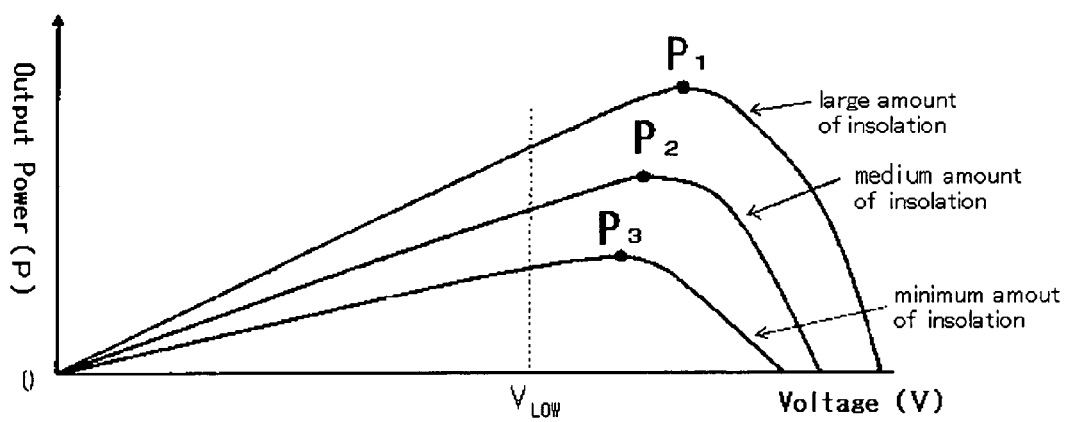
FIG. 2 is a power-voltage characteristic graph of the solar cell describing the operation of FIG. 1.

The controlling device 50 is composed of, in addition to a function generator 34 and an inverter controlling circuit 35 having the same functions as the conventional device, a newly added power and voltage monitoring circuit 51, an instructing value operation circuit 52, an adjustable speed controller 53 and a gradient coefficient operation device 54. And as each of the solar cells 1 have individually a voltage-power (V-P) characteristic that varies as shown in FIG. 2 depending on the variation in the amount of insolation. On the controlling device 50, although details will be described below, for each solar cell, the range of voltage drop $V_{OVER}$ from the voltage value $V_{BASE}$ at the maximum power point ($P_1$, $P_2$, $P_3$ and the like in FIG. 2), the minimum voltage value $V_{LOW}$ tolerated by the solar cell 1 in the V-P characteristic curve of the minimum amount of insolation at which the photovoltaic inverter 5 can operate (the minimum amount of insolation characteristic curve shown in the figure) as well as the allowable voltage regulation range Hb to changes in voltage are previously set as acquired by experiments. In this case, the range of voltage drop $V_{OVER}$ must be selected to be a value larger than the allowable voltage regulation range Hb to voltage changes. And to enable an optimum control in response to the usage of the device and the environment in which it is installed, the values of the voltage range $V_{OVER}$, the minimum voltage value $V_{LOW}$ and the allowable voltage regulation range Hb are set variable as required.

Figure 3:
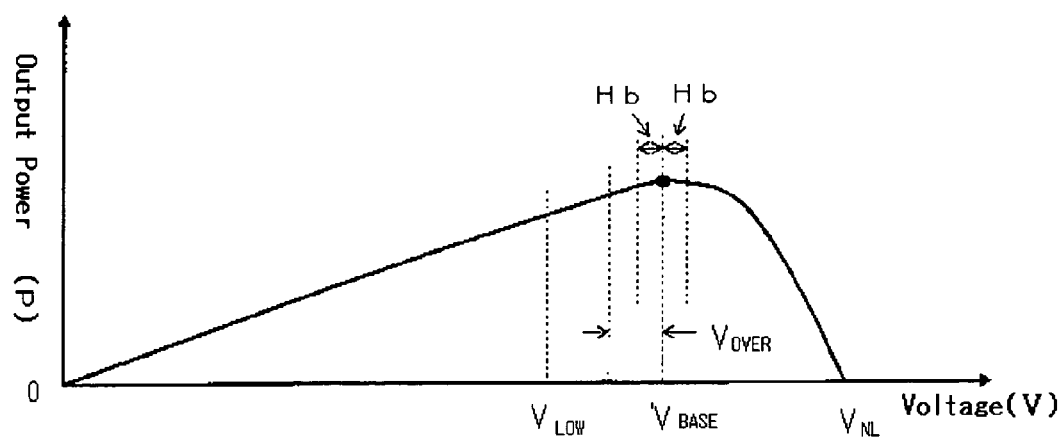
FIG. 3 is a characteristic graph describing the operation of the first embodiment of the present invention.

FIG. 3 is a characteristic graph for describing the first controlling method of the photovoltaic inverter of the present invention shown in FIG. 1.

In other words, when the solar cell 1 is exposed to a given amount of insolation, it shows a V–P characteristic as shown in FIG. 3. When the photovoltaic inverter is operated together with solar cells having such a characteristic, in response to a start-up instruction given, the adjustable speed controller 53 outputs a start-up frequency instructing value $f_s$ corresponding thereto. The inverter controlling circuit 35 calculates pulse width modulation (PWM) using this start-up frequency instructing value $f_s$ and an output voltage instructing value $V_s$ obtained by a calculation in which a given function is applied to this frequency instructing value $f_s$ in the function generator 34, and the control signals formed by the result of this calculation are used to control ON, OFF each of the transistors constituting the inverter main circuit 25 leading to the output of AC power having a voltage and frequency corresponding to the voltage instructing value $V_s$ and the frequency instructing value $f_s$ at the start-up time from the inverter main circuit 25. And the motor 3 and the pump 4 start up and begins running accordingly.

Then, the power and voltage monitoring circuit 51 calculates at intervals previously set power (P, P=V×1) based on the voltage (V) and the current (I) outputted by the solar cells 1 and detected by the voltage detector 21, the current detector 23, and monitors this power (P) and voltage (V).

The power and voltage monitoring circuit 51 basically generates a speed increase instruction when the power increases in response to a drop in the voltage monitored, and a speed reduction instruction when the power decreases in response to a voltage drop.

When the motor 3 starts up and begins rotating in response to a start-up instruction, the voltage V of the solar cell drops, as mentioned below, from the prior voltage value $V_{NL}$ representing an unloaded condition and the power increase as the frequency instructing value (f) outputted by the adjustable speed controller 53 increases, and therefore the power and voltage monitoring circuit 51 continues outputting a speed increase instruction to the instructing value operation circuit 52.

The instructing value operation circuit 52 to which this speed increase instruction has been inputted outputs a previously set speed increase instruction $+\Delta n$ (a constant value) to the adjustable speed controller 53. The adjustable speed controller 53 integrates this speed increase instructing value $+\Delta n$, and outputs the value obtained by adding the start-up frequency instructing value $f_s$ to the calculation result as a frequency instructing value (f).

Noting the fact that the power required for variable-speed controlling the motor 3 and the pump 4 with power supplied from the solar cells 1 as its power source is proportional to the cube of the rotational speed of the motor 3, and in view of the fact that the frequency instructing value (f) to the motor 3 outputted by the adjustable speed controller 53 is deemed to be a value corresponding more or less to the rotational speed of the motor 3, the gradient coefficient operation device 54 calculates $(f/f_{MAX})^3$ from the frequency instructing value (f) and the maximum value of the frequency instructing value ($f_{MAX}$), and in response to this value, the integrating time at the time when the adjustable speed controller 53 carries out an integral calculation of the $\Delta n$ is changed. For example, when the frequency instructing value f is a half of the maximum value $f_{MAX}$, the integrating time is $(1/2)^3=1/8$, in other words, 1/8 of the maximum integrating time is given thereto.

By changing thus the integrating time of $\Delta n$ depending on the frequency instructing value f, it will be possible, in a zone where the frequency instructing value f is important, in other words, in a zone where the rotational speed is slow, to change gently the rotational speed.

After the motor 3 and the pump 4 started up and began running by an AC voltage of a voltage and a frequency corresponding to the start-up voltage instructing value $V_s$ and the start-up frequency instructing value $f_s$ outputted by the inverter main circuit 25 at the time of start-up, the adjustable speed controller 53 generates frequency instructions (f) by integrating the speed increase instructing value $+\Delta n$ given by the instructing value operation circuit 52 by the integrating time given by the gradient coefficient operation device 54, and the frequency instructing value (f) outputted from this adjustable speed controller 53 increases smoothly. Accordingly, the motor 3 accelerates more smoothly.

In this process, the power and voltage monitoring circuit 51 calculates the power P based on the values V, I detected respectively by the voltage detector 21 and the current detector 23 by calculating P=V×I, finds out the point where this calculated power value turns out to be the maximum point (point Pn on the characteristic curve in FIG. 3), reads the voltage value of the solar cells 1 at this point, stores the same as the reference voltage $V_{BASE}$, and keeps on outputting accelerating instructions until the voltage of the solar cells 1 shifts from the reference voltage $V_{BASE}$ to a voltage lower by a previously set range of voltage drop $V_{OVER}$. The maximum point of power can be detected by comparing in each cycle the power detected recently and the power detected last time and by finding the turning point from increase to decrease or from decrease to increase.

Then, when the voltage of the solar cells 1 has shifted from the reference voltage $V_{BASE}$ to the voltage $V_{BASE}-V_{OVER}$ lower by a previously set range of voltage drop $V_{OVER}$, the power and voltage monitoring circuit 51 stops outputting the speed increase instructions and outputs speed reduction instructions to the instructing value operation circuit 52. As a result, as stated below, as the frequency instructing value (f) outputted by the adjustable speed controller 53 is reduced, the motor 3 decelerates and reduces its load. Accordingly, the voltage of the solar cells 1 rises, and the power and voltage monitoring circuit 51 keeps on outputting speed reduction instructions to the instructing value operation circuit 52 during this period.

The instructing value operation circuit 52 to which this speed reduction instruction has been inputted outputs to the adjustable speed controller 53 the previously set speed reduction instructing value $-\Delta n$ (a constant value), and the adjustable speed controller 53 integrates this speed reduction instructing value $-\Delta n$, and outputs the value obtained by adding the frequency instructing value (f) to this calculation result as a new frequency instructing value (f).

In other words, the rotational speed of the motor 3 and the pump 4 smoothly decelerates from the rotational speed prevailing at the time when the voltage of the solar cells 1 reached $V_{BASE}-V_{OVER}$ as the frequency instructing value (f) outputted by the adjustable speed controller 53 is reduced, and when the voltage V of the solar cell 1 has risen to the reference voltage $V_{BASE}$, the power and voltage monitoring circuit 51 stops outputting speed reduction instructions causing the adjustable speed controller 53 to stop reducing the value of the frequency instructions. As a result, the power output of the solar cell 1 shifts to the maximum power point Pn, where the operation continues.

Thereafter, even if the amount of insolation changes and minute disturbances occurs to the pump 4, when the voltage of the solar cells 1 monitored by the power and voltage monitoring circuit 51 is limited, as shown in FIG. 3, to changes within the given allowable voltage regulation range Hb $(=V_{BASE}\pm Hb)$ with reference to the reference voltage $V_{BASE}$, the motor 3 and the pump 4 continue running based on the frequency instructing value (f) valid during their operation at the reference voltage $V_{BASE}$. Therefore, they can keep up their stable operation without any fluctuations of loads in the vicinity of the maximum power point.

The value of voltage drop range $V_{OVER}$ from the reference voltage $V_{BASE}$ in the process of speed increase at the time of start-up exceeds the allowable voltage regulation range Hb in reference to the reference voltage $V_{BASE}$ set as the zone of insensibility to the monitoring voltage in the power and voltage monitoring circuit 51. Therefore, a value greater than this value is chosen for the same.

Figure 4:
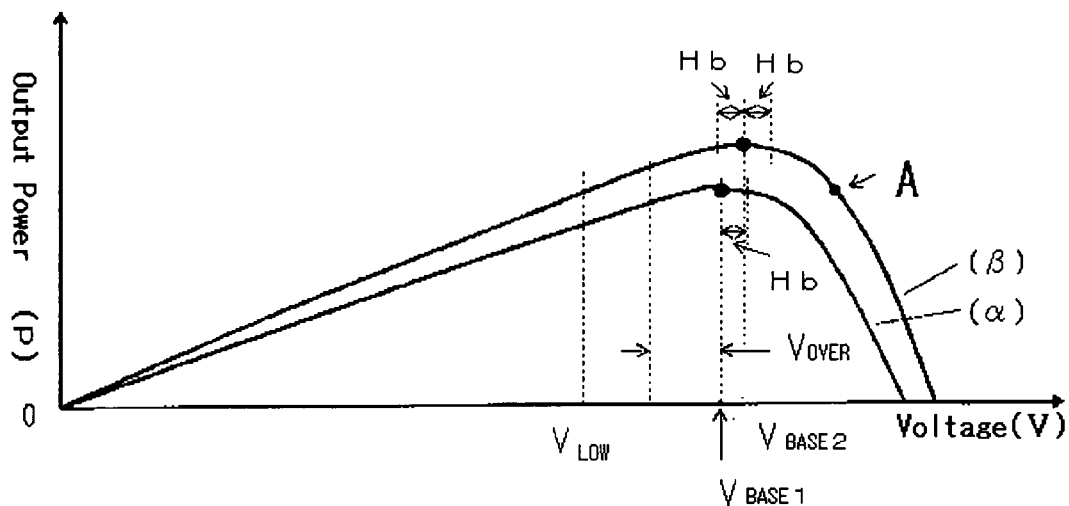
FIG. 4 is a characteristic graph describing the operation of the second embodiment of the present invention.

FIG. 4 is a characteristic graph for describing the embodiment 2 of the present invention. This characteristic graph shows that the amount of insolation increased during a continuous operation in the vicinity of the maximum power point in the first embodiment described with reference to FIG. 3 and that the voltage and power characteristic of the solar cells 1 has changed from the characteristic curve α to the characteristic curve β.

As such an increase in the amount of insolation leads to an increased output voltage of the solar cells 1, the operating point shifts from the point $P_A$ of the characteristic curve α to the point $P_B$ of the characteristic curve β in FIG. 4. As a result, the voltage V of the solar cell 1 monitored by the power and voltage monitoring circuit 51 has increased in excess of the allowable voltage regulation range Hb with reference to the reference voltage $V_{BASE}$ (shown as $V_{BASE}$ 1 in FIG. 4) in FIG. 3 ($V>V_{BASE}$ 1+Hb), and the power and voltage monitoring circuit 51 outputs a new speed increase instruction. This speed increase instruction continues to be outputted until the voltage of the solar cell 1 drops to the voltage $V_{BASE}$ 1-$V_{OVER}$ as described below.

Therefore, as the frequency instructing value (f) outputted by the adjustable speed controller 53 increases, the photovoltaic inverter 25 increases its output voltage and frequency to accelerate smoothly the motor 3 and the pump 4. During this acceleration process, the power and voltage monitoring circuit 51 calculates power P (P=V×I) based on the respective outputs (V, I) of the voltage detector 21 and the current detector 23, finds the maximum value (point Pc on the characteristic curve β in FIG. 4) of this calculated power value, stores the voltage value of the solar cells 1 at this maximum power point as a new reference voltage $V_{BASE}$ 2, and at the same time accelerates the motor speed until the voltage V of the solar cell 1 shifts from the reference voltage $V_{BASE}$ 1 to the voltage $V_{BASE}$ 1-$V_{OVER}$ lower by a previously set range of voltage drop $V_{OVER}$.

Then, when the voltage V of the solar cell 1 has reached $V_{BASE}$ 1-$V_{OVER}$, the power and voltage monitoring circuit 51 stops outputting the speed increase instructions, outputs a speed reduction instruction to the instructing value operation circuit 52, and keeps on outputting the speed reduction instruction to the instructing value operation circuit 52 until the voltage V rises to the new reference voltage $V_{BASE}$2 from $V_{BASE}$1-$V_{OVER}$ as the adjustable speed controller 53 reduces the frequency instructing value (f) as described below.

In other words, the rotational speed of the motor 3 and the pump 4 prevailing at the time when the voltage V of the solar cells 1 is $V_{BASE}$ 1-$V_{OVER}$ decelerates smoothly as the frequency instructing value (f) outputted by the adjustable speed controller 53 is reduced, and when the voltage of the solar cells 1 has risen to the $V_{BASE}$ 2, the power and voltage monitoring circuit 51 stops outputting the speed reduction instructions, and then the adjustable speed controller 53 also stops reducing the frequency instructing values outputted by the same.

Then, when the variation of the voltage V of the solar cells 1 monitored by the power and voltage monitoring circuit 51 is within the given allowable voltage regulation range Hb (V=$V_{BASE}$ 2±Hb) in reference to the reference voltage $V_{BASE}$ 2 as shown in FIG. 4, the motor 3 and the pump 4 keeps on running based on the frequency instructing value (f) when the speed reduction instruction is suspended.

Figure 5:
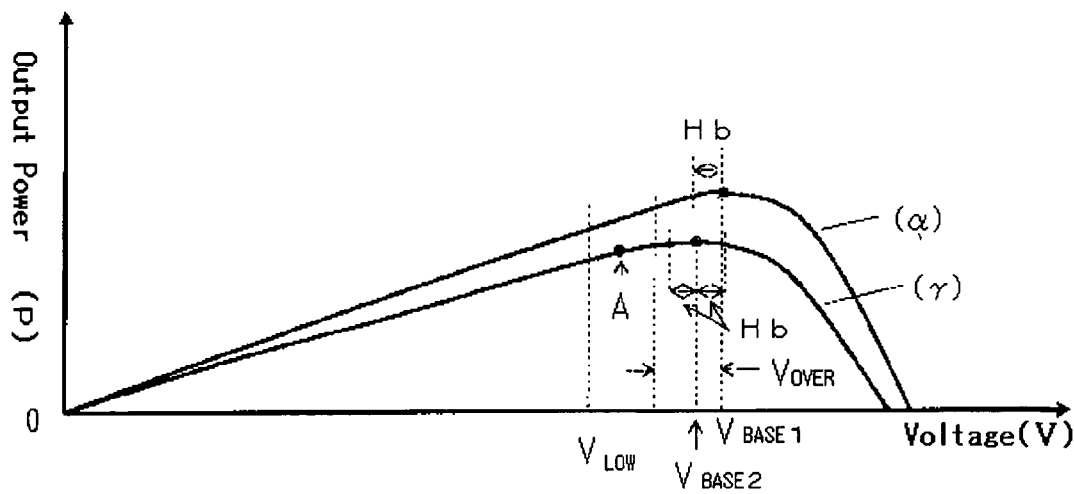
FIG. 5 is a characteristic graph describing the operation of the third embodiment of the present invention.

FIG. 5 is a characteristic graph for describing the third embodiment of the present invention. This characteristic graph shows that the amount of insolation decreased during a continuous operation in the vicinity of the maximum power point in the first embodiment described with reference to FIG. 3 and that the voltage and power characteristic of the solar cells 1 has changed from the characteristic curve α to the characteristic curve γ in FIG. 5.

In other words, as a decrease in the amount of insolation leads to a reduced output voltage of the solar cells 1, the operating point shifts from the point $P_A$ of the characteristic curve α in FIG. 4 to the point $P_D$ of the characteristic curve γ. As a result, the voltage V of the solar cell 1 monitored by the power and voltage monitoring circuit 51 has dropped in excess of the allowable voltage regulation range Hb in reference to the reference voltage $V_{BASE}$ (shown as $V_{BASE}$ 1 in FIG. 5) in FIG. 3 (V<$V_{BASE}$ 1-Hb), and the power and voltage monitoring circuit 51 outputs a new speed reduction instruction. This speed reduction instruction continues to be outputted until the voltage V of the solar cells 1 rises to the reference voltage $V_{BASE}$ 1 as described below.

In other words, in response to a speed reduction instruction outputted by the power and voltage monitoring circuit 51, the frequency instructing value (f) outputted by the adjustable speed controller 53 is reduced, and this is followed by a corresponding reduction in the frequency and voltage outputted by the photovoltaic inverter 25, causing the motor 3 and the pump 4 to decelerate smoothly. And when the voltage of the solar cells 1 has reached the reference voltage $V_{BASE}$1, the power and voltage monitoring circuit 51 stops outputting speed reduction instructions, the adjustable speed controller 53 also stops reducing its output of frequency instructing values (f), and the rotational speed of the motor 3 remains fixed at a rotational speed determined by the voltage V of the solar cells 1 serving as the reference voltage $V_{BASE}$ 1.

Then, when the motor 3 and the pump 4 reaches a rotational speed determined by the voltage V of the solar cells 1 serving as the reference voltage $V_{BASE}$1, the power and voltage monitoring circuit 51 outputs a new speed increase instruction, and as the frequency instructing value (f) outputted by the adjustable speed controller 53 increases, the output frequency and voltage of the photovoltaic inverter 25 increase, and the motor 3 and the pump 4 accelerate smoothly. At this time, the power and voltage monitoring circuit 51 calculates power P (P=V×I) based on the values V, I detected respectively by the voltage detector 21 and the current detector 23, and the detected value of the voltage V of the solar cell 1 at the point (point $P_E$ on the characteristic curve γ in FIG. 5) where this calculated power value will be the maximum value) is stored as the new reference voltage $V_{BASE}$ 3, and the motor 3 and the pump 4 will be accelerated until voltage V of the solar cells 1 reaches $V_{BASE}$ 1–$V_{OVER}$.

Then, when the voltage V of the solar cell 1 has reached $V_{BASE}$ 1–$V_{OVER}$, the power and voltage monitoring circuit 51 stops outputting the speed increase instructions, outputs a speed reduction instruction to the instructing value operation circuit 52. As a result, as stated below, following a drop in the frequency instructing value (f) outputted by the adjustable speed controller 53, the voltage V of the solar cells 1 rises to a new reference voltage $V_{BASE}$ 3. During this period, the power and voltage monitoring circuit 51 continues outputting this speed reduction instructions to the instructing value operation circuit 52.

In other words, the rotational speed of the motor 3 and the pump 4 prevailing at the time when the voltage V of the solar cell 1 is $V_{BASE}$–$V_{OVER}$ decelerates smoothly as the frequency instructing value (f) outputted by the adjustable speed controller 53 is reduced, and when the voltage V of the solar cell 1 has risen to the reference voltage $V_{BASE}$ 3, the power and voltage monitoring circuit 51 stops outputting the speed reduction instructions, and then the adjustable speed controller 53 also stops reducing its frequency instruction output.

Then, when the voltage V of the solar cells 1 monitored by the power and voltage monitoring circuit 51 is within the given allowable voltage regulation range Hb (V≦$V_{BASE}$ 3±Hb) with reference to the new reference voltage $V_{BASE}$3, the motor 3 and the pump 4 keeps on running based on the frequency instructing value (f) when the speed reduction instruction is suspended.

Figure 6:
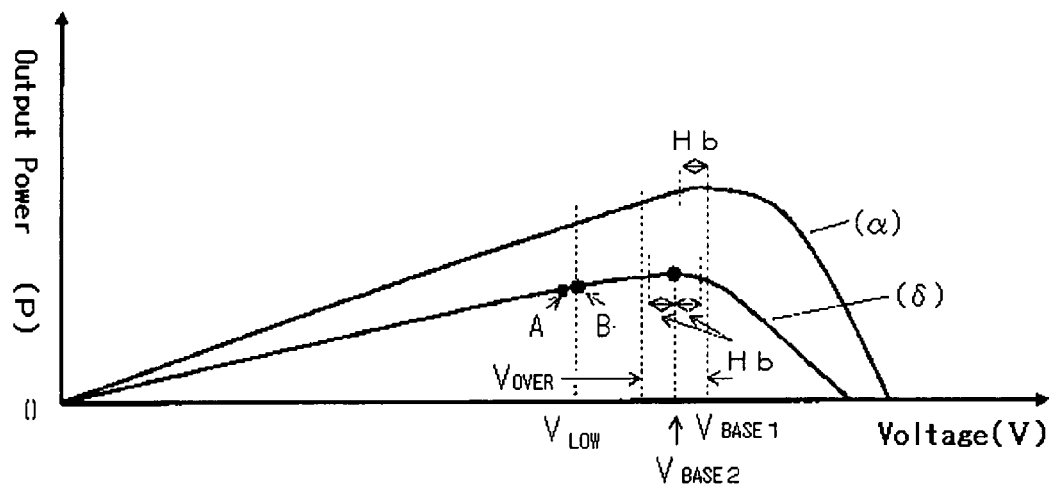
FIG. 6 is a characteristic graph describing the operation of the fourth embodiment of the present invention.
Figure 7:
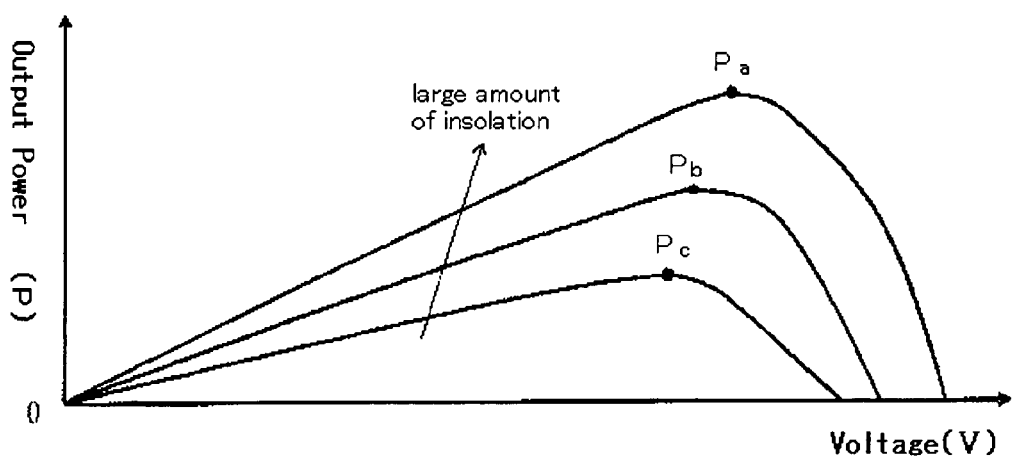
FIG. 7 is a general characteristic graph of the solar cell.

FIG. 6 is a characteristic graph for describing the fourth embodiment of the present invention. This characteristic graph shows that the amount of insolation decreased sharply during a continuous operation in the vicinity of the maximum power point in the first embodiment described with reference to FIG. 3 and that the power and voltage characteristic of the solar cell 1 has changed from the characteristic curve α to the characteristic curve δ in FIG. 6.

In other words, when the amount of insolation decreases rapidly to the bottom, and, as shown in FIG. 6, due to the characteristics of the solar cells 1, the operating point shifts from the point $P_A$ of the characteristic curve α to the point $P_F$ of the characteristic curve δ, the voltage of the solar cell 1 monitored by the power and voltage monitoring circuit 51 drops below the minimum voltage value $V_{LOW}$ already fixed. As a result, the power and voltage monitoring circuit 41 outputs a rapid speed reduction instruction. In response to this rapid speed reduction instruction, the instructing value operation circuit 52 gives to the adjustable speed controller 53 a speed reduction instructing value −Δn for reducing the frequency instructing value (f) and for increasing rapidly the voltage V of the solar cell 1 to the minimum voltage $V_{LOW}$ (point $P_G$ in FIG. 6).

Then, when the operating point shifts to the point $P_G$ on the characteristic curve δ, the power and voltage monitoring circuit 51 outputs a new speed reduction instruction. This speed reduction instruction continues being outputted until the voltage V of the solar cell 1 reaches the reference voltage $V_{BASE}$ 1 at the maximum power point on the characteristic curve α.

In other words, following a reduction in the frequency instructing value (f) outputted by the adjustable speed controller 53 in response to the speed reduction instruction, the motor 3 and the pump 4 decelerate smoothly, and as a result, when the rotation speed is reduced to that at which voltage V of the solar cell 1 becomes the reference voltage $V_{BASE}$ 1, the power and voltage monitoring circuit 51 gives a new speed increase instruction, and the motor 3 and the pump 4 accelerate smoothly following an increase in the frequency instructing value (f) outputted by the adjustable speed controller 53. At this time, the power and voltage monitoring circuit 51 calculates power P (P=V×I) based on the values V, I detected respectively by the voltage detector 21 and the current detector 23, and stores the value detected of the voltage V of the solar cell 1 at the point (point $P_H$ on the characteristic curve δ in FIG. 6) where this calculated value of power will be maximum as a new reference voltage $V_{BASE}$ 4, and accelerates until the voltage V of the solar cell 1 reaches $V_{BASE}$ 1–$V_{OVER}$.

Then, when the voltage V of the solar cell 1 has reached $V_{BASE}$ 1–$V_{OVER}$, the power and voltage monitoring circuit 51 stops outputting the speed increase instructions, outputs a speed reduction instruction to the instructing value operation circuit 52. As a result, following a drop in the frequency instructing value (f) outputted by the adjustable speed controller 53, as described below, the voltage V of the solar cells 1 rises to a new reference voltage $V_{BASE}$ 4. During this period, the power and voltage monitoring circuit 51 continues outputting this speed reduction instructions to the instructing value operation circuit 52.

In other words, the rotational speed of the motor 3 and the pump 4 prevailing at the time when the voltage V of the solar cell 1 is $V_{BASE}$ 1–$V_{OVER}$ decelerates smoothly as the frequency instructing value (f) outputted by the adjustable speed controller 53 is reduced, and when the voltage V of the solar cell 1 has risen to a new reference voltage $V_{BASE}$ 4, the power and voltage monitoring circuit 51 stops outputting the speed reduction instructions, and then the adjustable speed controller 53 also stops reducing its output.

Then, when the voltage V of the solar cell 1 monitored by the power and voltage monitoring circuit 51 is, as shown in FIG. 5, within a given allowable voltage regulation range Hb (($V \leq V_{BASE}$ 4±Hb) with reference to the reference voltage $V_{BASE}$ 4, the motor 3 and the pump 4 keeps on running based on the frequency instructing value (f) when the speed reduction instruction is suspended.

Incidentally, in the first through the fourth embodiments described above, the case of prolonging the acceleration and deceleration times in zones where the rotational speed of the motor 3 and the pump 4 is fast and of varying gently the rotational speed by using the adjustable speed controller 53 and the gradient coefficient operation device 54 is described. However, for uses involving few and gentle variations in the amount of insolation, the acceleration and deceleration times of the motor 3 and the pump 4 can be set at a constant value.

When such a controlling method of photovoltaic inverter is applied to the adjustable speed control of motors driving water feeding pumps, it is possible to design a water feeding device provided with solar cells as its power source. Such a water feeding device can operate by following the maximum power point of the solar cells in each moment even if the amount of insolation towards the solar cells fluctuates, and therefore it is possible to take the maximum advantage of the output of the solar cells even if the quantity of water supplied may change depending on the sunshine available, and therefore the efficiency of water feeding will be very high vis-à-vis the amount of insolation.

INDUSTRIAL APPLICABILITY

According to the present invention, when a motor is to be variable-speed controlled by means of a photovoltaic inverter fed with power from solar cells, due to an arrangement that made it possible to monitor any changes in the terminal voltage of solar cells and, in case of any change in the amount of insolation towards the solar cells, to control the photovoltaic inverter so that it may be operated at the maximum power point for that amount of insolation, it is possible to eliminate any fluctuations of control in the vicinity of the maximum power point at each moment of the solar cells, to maintain stability in their operation and to improve response time in connection with rapid changes in the amount of insolation.

The invention claimed is:

1. A method of controlling a photovoltaic inverter for variable-speed controlling a motor with solar cells as its power source comprising a step of starting up the motor by supplying a start-up power through the photovoltaic inverter from said solar cells while monitoring the output power and voltage of said solar cells, a step of storing the voltage value of the solar cells as a reference voltage ($V_{BASE}$) when the power of said solar cells reached the maximum power point in the process of accelerating the rotational speed of this motor for a given acceleration time, a step of continuing accelerating until the voltage of the solar cells shifts from said reference voltage ($V_{BASE}$) to a first voltage ($V_{BASE}$–$V_{OVER}$) that is lower than said reference voltage by a previously set voltage ($V_{OVER}$), a step of, after the voltage of the solar cells reached the first voltage ($V_{BASE}$–$V_{OVER}$), decelerating the speed of said motor for a given deceleration time until the voltage of the solar cells shifts from this voltage to said reference voltage ($V_{BASE}$), and a step of, after this deceleration operation is over, when the voltage of the solar cells is within the given allowable voltage regulation range (Hb) with reference to said reference voltage ($V_{BASE}$), controlling said photovoltaic inverter in such way that said motor may continue operating at the current speed.

2. The method of controlling a photovoltaic inverter according to claim 1 wherein, during said continuous operation, when the voltage of the solar cells rises beyond the given allowable voltage regulation range (Hb) with reference to said reference voltage ($V_{BASE}$), the rotational speed of the motor is accelerated for a given acceleration time until the voltage of the solar cells shifts from said reference voltage ($V_{BASE}$) to the first voltage ($V_{BASE}$–$V_{OVER}$), and the voltage value of the solar cells prevailing at the time when the power of the solar cells reached the maximum power point in this acceleration process is stored as a new reference voltage ($V_{BASE}$ 2), and after the voltage of the solar cells reached said first voltage ($V_{BASE}$–$V_{OVER}$), said photovoltaic inverter is controlled in such a way that the rotational speed of said motor may be decelerated by a given deceleration time until the voltage of the motor shifts from this voltage to said new reference voltage ($V_{BASE}$ 2).

3. The controlling method of a photovoltaic inverter according to claim 1 wherein, during said continuous operation, when the voltage of said solar cells drops beyond said allowable voltage regulation range (Hb) with reference to said reference voltage ($V_{BASE}$), the rotational speed of said motor is decelerated by a given deceleration time until said voltage of the solar cells reaches said reference voltage value ($V_{BASE}$), the rotational speed of said motor is accelerated for a given acceleration time until the voltage of said solar cells shifts from the reference voltage ($V_{BASE}$) to the first voltage ($V_{BASE}$–$V_{OVER}$), and the voltage value of the solar cells prevailing at the time when the power of said solar cells reached the maximum power point in this acceleration process is stored as a new reference voltage ($V_{BASE}$ 3), and after the voltage of said solar cells reached said first voltage ($V_{BASE}$ –$V_{OVER}$), said photovoltaic inverter is controlled in such a way that the rotational speed of said motor may be decelerated by a given deceleration time until the voltage of the motor shifts from this voltage to said new reference voltage ($V_{BASE}$ 3).

4. The controlling method of a photovoltaic inverter according to claim 1 wherein, during said continuous operation, when the voltage of said solar cells drops beyond a minimum voltage value ($V_{LOW}$) tolerated by solar cells, the rotational speed of said motor is rapidly decelerated by a deceleration time shorter than the given deceleration time until the voltage of said solar cells reaches said minimum voltage value ($V_{LOW}$), then the rotational speed of said motor is decelerated by said given deceleration time until the voltage of said solar cells reaches said reference voltage ($V_{BASE}$), and after the voltage of said solar cells reached said reference voltage ($V_{BASE}$), the rotational speed of said motor is accelerated by a given acceleration time until the voltage of said solar cells shifts from this voltage to the first voltage ($V_{BASE}-V_{OVER}$), and the voltage value of said solar cells prevailing at the time when the power of said solar cells reached the maximum power point in this acceleration process is stored as a new reference voltage ($V_{BASE}$ 4), and after the voltage of said solar cells reached said first voltage ($V_{BASE}-V_{OVER}$), said photovoltaic inverter is controlled in such a way that the speed of said motor may be decelerated by the given deceleration time until the voltage of the motor shifts from this voltage to said new reference voltage ($V_{BASE}$ 4).

5. The controlling method of a photovoltaic inverter according to claim 1, wherein said motor is a motor for driving a pump or a fan.

6. The controlling method of a photovoltaic inverter according to claim 5 wherein the acceleration time and the deceleration time of the motor for driving said pump or fan is set at a value equivalent to the cube of the ratio $(n/N_{MAX})^3$ of the present rotational speed instructing value (n) to the maximum set value ($N_{MAX}$) of the rotational speed of this motor.

7. The controlling method of a photovoltaic inverter according to claim 2, wherein said motor is a motor for driving a pump or a fan.

8. The controlling method of a photovoltaic inverter according to claim 3, wherein said motor is a motor for driving a pump or a fan.

9. The controlling method of a photovoltaic inverter according to claim 4, wherein said motor is a motor for driving a pump or a fan.

10. A controlling device of a photovoltaic inverter for variable-speed controlling a motor fed with power from solar cells comprising power and voltage monitoring means for monitoring respectively the power and voltage of said solar cells, an instructing value operation means for outputting acceleration or deceleration instructions based on this power and voltage monitoring means, a gradient coefficient operation means for outputting acceleration time or deceleration time, an adjustable speed controlling means for outputting frequency instructions based on the outputs of the instructing value operation means and the gradient coefficient operation means, wherein the voltage value of said solar cells prevailing at a time when the power of said solar cells reached the maximum point in the process of accelerating said motor is stored as a reference value ($V_{BASE}$), at the same time the motor is accelerated until the voltage of said solar cells shifts from said reference voltage ($V_{BASE}$) to first voltage ($V_{BASE}-V_{OVER}$) that is lower than the reference voltage by a previously set voltage ($V_{OVER}$), and after the voltage of said solar cells reached said first voltage ($V_{BASE}-V_{OVER}$) the motor is decelerated until the voltage of said solar cells reaches said reference voltage ($V_{BASE}$), and after this deceleration operation, when the voltage of said solar cells is within the given allowable voltage regulation range (Hb) with reference to said reference voltage ($V_{BASE}$), the photovoltaic inverter is controlled in such a way that said motor may continue operating at the present rotational speed.

11. A water feeding device for feeding water by driving a pump variable-speed controlled by a photovoltaic inverter fed with power from solar cells wherein, in the process of starting up said motor and accelerating said motor by a given acceleration time while monitoring respectively the power and voltage of said motor, the voltage value of said solar cells prevailing at a time when the power of said solar cells has reached the maximum power point is stored as a reference voltage ($V_{BASE}$), and the motor is accelerated until the voltage (Vo) of said solar cells shifts from said reference voltage ($V_{BASE}$) to a first voltage ($V_{BASE}-V_{OVER}$) that is lower than the reference voltage by a previously set voltage ($V_{OVER}$), and after the voltage of said solar cells has reached said first voltage ($V_{BASE}-V_{OVER}$), the motor is decelerated until the voltage of said solar cells shifts from this voltage to said reference voltage ($V_{BASE}$), and after this deceleration operation is over, when the voltage of said solar cells is within the given allowable voltage regulation range (Hb) with reference to said reference voltage ($V_{BASE}$), said motor is kept operating at the present rotational speed to drive the pump and to feed water.

* * * * *